(12) United States Patent
Fitzgerald

(10) Patent No.: US 12,730,987 B2
(45) Date of Patent: Sep. 8, 2026

(54) METHODS AND SYSTEMS FOR MONITORING BARCODE SCANNER PERFORMANCE

(71) Applicant: Zebra Technologies Corporation, Lincolnshire, IL (US)

(72) Inventor: Thomas Fitzgerald, Coventry, CT (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 19/067,199

(22) Filed: Feb. 28, 2025

(65) Prior Publication Data

US 2026/0260082 A1 Sep. 3, 2026

(51) Int. Cl.
*G06K 7/00* (2006.01)

(52) U.S. Cl.
CPC .................................. *G06K 7/0095* (2013.01)

(58) Field of Classification Search
USPC .......................................................... 235/438
See application file for complete search history.

(56) References Cited

U.S. PATENT DOCUMENTS 7,611,060 B2 * 11/2009 Wang ................. G06K 7/10811 235/462.11
11,630,067 B2 * 4/2023 Chang .................... G16B 50/40 250/461.1
2009/0166424 A1 * 7/2009 Gerst ................. G06K 7/10792 235/462.2
2013/0112750 A1 * 5/2013 Negro .................. G06K 7/1443 235/454
2013/0112752 A1 * 5/2013 Negro ................ G06K 7/10722 235/472.01
2013/0313312 A1 * 11/2013 Wang ................. G06K 7/10861 235/375
2016/0104021 A1 * 4/2016 Negro .................. G06K 7/1465 235/462.08
2024/0249095 A1 * 7/2024 Lee .................... G06K 7/10722
2024/0365004 A1 * 10/2024 Tang .................... G06K 7/1443

* cited by examiner

*Primary Examiner* — Allyson N Trail

(57) ABSTRACT

A system includes: a barcode scanner configured to: capture a plurality of images corresponding to a field of view of the barcode scanner, each image containing a barcode; for each of the captured images, (i) initiate an attempt to decode the barcode, (ii) generate a set of data associated with the attempt to decode the barcode; and a computing device configured to: obtain the sets of data from the barcode scanner; for each of a plurality of portions of the field of view, generate a performance metric based on at least one of the sets of data from the barcode scanner; and control a display to present the portions of the field of view, each presented portion having a visual indicator selected according to the corresponding performance metric.

20 Claims, 6 Drawing Sheets

METHODS AND SYSTEMS FOR MONITORING BARCODE SCANNER PERFORMANCE

BACKGROUND

Deploying a sensor device such as a barcode scanner may involve selecting a physical position and orientation of the device, e.g., relative to a target region to be sensed by the device when in use. Deployment may also involve setting configuration parameters for the device, such as focal length and the like. The performance of the device may be affected by complex combinations of factors, including the position and orientation of the device, the configuration parameters, and environmental attributes such as surface reflectance in or near the target region, variations between target objects and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
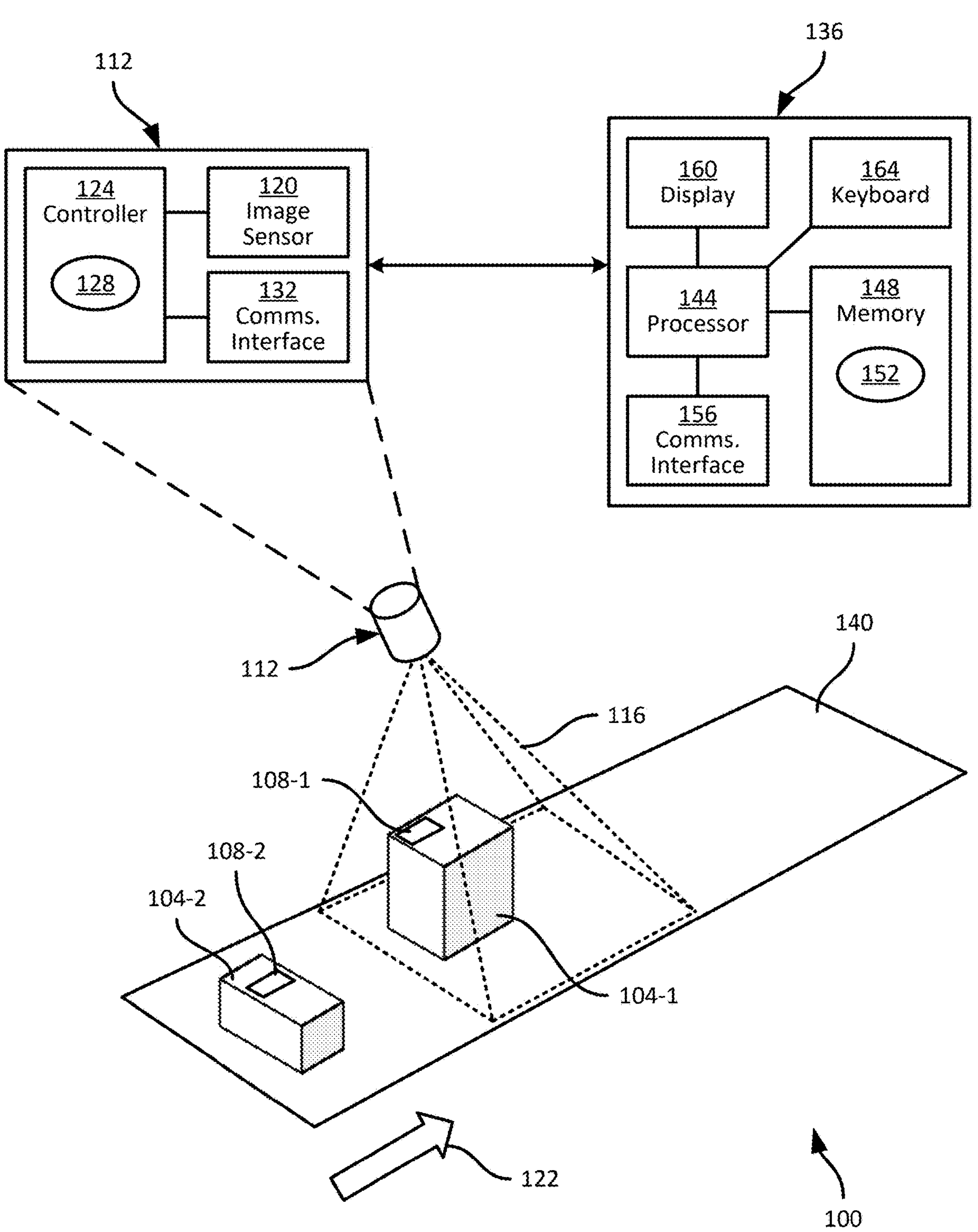
FIG. 1 is a diagram of a barcode scanning system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a system, comprising: a barcode scanner configured to: capture a plurality of images corresponding to a field of view of the barcode scanner, each image containing a barcode; for each of the captured images, (i) initiate an attempt to decode the barcode, (ii) generate a set of data associated with the attempt to decode the barcode; and a computing device configured to: obtain the sets of data from the barcode scanner; for each of a plurality of portions of the field of view, generate a performance metric based on at least one of the sets of data from the barcode scanner; and control a display to present the portions of the field of view, each presented portion having a visual indicator selected according to the corresponding performance metric.

Additional examples disclosed herein are directed to a method, comprising: obtaining, at a computing device communicatively connected with a barcode scanner, a plurality of sets of data associated with attempts to decode barcodes within a field of view of the barcode scanner; for each of a plurality of portions of the field of view, generating a performance metric at the computing device based on at least one of the sets of data from the barcode scanner; and controlling a display to present the portions of the field of view, each presented portion having a visual indicator selected according to the corresponding performance metric.

FIG. 1. illustrates a system 100 configured to detect and decode machine-readable indicia such as a barcodes. In the discussion below, the term "barcode" includes indicia using one-dimensional symbologies that encode data in linear arrays (e.g., UPC-A, Code 128, and the like), as well as indicia with two-dimensional symbologies (e.g., Data Matrix, QR Code, DotCode, and the like). In further embodiments, the mechanisms described below can be implemented to detect and decode other forms of machine-readable information, such as text (e.g., to implement an optical character recognition process or the like).

The system 100 can be deployed in any of a variety of environments, such a transport and logistics facility in which items 104-1, 104-2 (collectively referred to as the items 104, and generically referred to as an item 104; similar nomenclature is also used for other elements in the discussion below) are handled. The items 104 can include parcels, for example, although the nature of the items 104 can vary. For example, in another embodiment, the system 100 can be deployed in a manufacturing facility and the items 104 can include parts, supplies, or the like. Various other operating environments, and corresponding item types, will also occur to those skilled in the art.

The items 104 include respective barcodes 108-1, 108-2. The barcodes 108 can be presented on labels affixed to the items 104, printed or otherwise applied directly to the items 104, or the like. The system 100 includes a barcode scanner 112 having a field of view (FOV) 116. The barcode scanner 112 can be a fixed industrial scanner, e.g., mounted in a static position in a facility, at a given angle, height, and the like. The FOV 116 is defined by a sensor 120 of the scanner 112, such as an image sensor, and by the mounting configuration of the scanner 112. The scanner 112 can also include a controller 124, such as an application-specific integrated circuit (ASIC), a field-programmable gate array (FPGA), or the like executing computer-readable instructions 128 that configure the scanner 112 to capture and process images using the sensor 120. The controller 124 can also be implemented, in other examples, as a central processing unit (CPU), a graphics processing unit (GPU) or the like, connected with one or more storage components storing the instructions 128.

The scanner 112 can also include a communications interface 132, permitting the scanner 112 to exchange data with one or more other devices, such as a computing device 136 (also referred to as the device 136), discussed in further detail below. The interface 132 can include either or both of a wired interface (e.g., a Universal Serial Bus (USB) interface, an Ethernet interface, or the like), and a wireless interface (e.g., Bluetooth™, Wi-Fi™, a cellular interface, or the like).

The items 104 can be placed within the FOV 116, passed through the FOV 116, or the like. In the illustrated example, the items 104 travel through the FOV 116 on a conveyor 140, e.g., in a direction 122. In other examples, the items 104 can be positioned within the FOV 116 by a worker in the facility in which the system 100 is deployed. The scanner 112 is configured to capture a sequence of images, e.g., as a video stream, as individual frames captured in response to triggering of a motion sensor or the like by an item 104, in response to an input from an operator, or the like.

The scanner 112 is further configured to detect barcodes in each captured image, and to attempt to decode such barcodes. A given image may contain more than one barcode, e.g., because more than one barcode appears on an item 104, and/or because more than one item 104 appears in the image. The scanner 112 is configured to detect the barcodes 108, e.g., by detecting regions of interest within the image that meet criteria corresponding to one or more barcode symbologies (e.g., predefined shapes, horizontal gradients, edges, and the like). Having detected barcode candidates, the scanner 112 is configured to initiate an attempt to decode each barcode 108. Decoding can be conducted according to various sets of operations, e.g., dependent on the symbology of the barcode 108, as will be apparent to those skilled in the art.

The scanner 112 can be configured to transmit decode results, e.g., including decoded strings of text, numbers and the like, to the computing device 136 and/or one or more other computing devices. Such devices can be configured to further process the decode results, e.g., to support material handling procedures in the facility in which the system 100 is deployed.

Under certain conditions, the scanner 112 may fail to decode a barcode 108. The item 104 carrying that barcode 108 may then need to be scanned again, and/or may be improperly handled as a result of having been improperly identified (or not identified) by the system 100. Certain decoding failures may result from damage to barcodes 108, occlusion of barcodes 108 by other objects, or the like. Some decoding failures, however, may result from the configuration of the scanner 112. For example, when the scanner 112 is deployed, deployment staff may select a position and orientation at which to install the scanner 112 relative to a target region (e.g., a portion of the conveyor 140). The deployment staff may also set various scanner parameters 112 (e.g., to be stored at the controller 124), such as a focal length, a frame rate, and the like.

Configuration attributes such as those mentioned above may be selected to optimize the performance of the scanner 112, e.g., to permit the scanner 112 to consistently decode barcodes at a range of depths (e.g., distances from the sensor 120) within the FOV 116. The relationships between the above attributes and scanner performance, however, may be complex, as scanner performance may also depend on environmental factors such as lighting in the facility, reflectance of a surface of the conveyor, attributes of the items 104 (e.g., color, reflectance, and the like), as well as the barcode symbologies expected to be encountered by the scanner 112. Deploying the scanner 112 may therefore be reliant on deployment staff judgement and experience. Configuring the scanner 112 may also be iterative, e.g., with deployment staff installing the scanner 112 with a given configuration, and returning subsequently to adjust the configuration based on feedback from other staff at the facility. The length of time available for configuration and subsequent adjustments may be limited, however. Further, the nature of the feedback received by deployment staff may be vague and subjective, such that the selection of adjusted configuration attributes also remains dependent on deployment staff experience and judgement.

Deployment staff may inspect the decode results mentioned above, e.g., in the form of a list of successfully or unsuccessfully decoded barcodes detected by the scanner 112 over a given period of time. However, correlating the decode results with configuration attributes such as the physical positioning of the scanner 112, the focal depth of the scanner 112 and the like remains dependent on the experience and judgement of the deployment staff. Inspection of decode results may therefore be a time-consuming and error-prone process, and configuration changes to the scanner 112 selected due to such inspection may not actually improve the performance of the scanner 112.

To reduce or eliminate the need for subjective judgement of deployment staff to correlate decode results with scanner performance and/or configuration, the computing device 136 is configured to process decode results received from the scanner 112 to generate performance metrics therefrom, correlated with portions of the FOV 116 of the scanner 112. By outputting such performance metrics, the device 136 can provide an objective representation of scanner performance previously unavailable to deployment staff.

Certain internal components of the device 136 are illustrated in FIG. 1, including a processor 144, such as a CPU, GPU, ASIC, FPGA, or the like. The processor 144 is communicatively coupled with a non-transitory computer-readable storage medium such as a memory 148, e.g., one or more volatile memory elements (e.g., random access memory (RAM)), one or more non-volatile memory elements (e.g., flash memory or the like), or a combination thereof. The memory 148 stores a plurality of computer-readable instructions in the form of applications. In the illustrated, the memory 148 stores a scanner performance monitoring application 152, whose execution by the processor 144 configures the device 136 to process decode results received from the scanner 112 and generate performance metrics corresponding to various portions of the FOV 116. The performance metrics can be presented to deployment staff and/or provided to other computing devices, and may also be used as inputs to processes for adjusting the configuration of the scanner 112.

The device 136 also includes a communications interface 156, enabling the device 136 to communicate with other computing devices, such as the scanner 112, via any suitable communications links. The device 136 can also include one or more output devices, such as a display 160, configured to render information visually under the control of the processor 144. In other examples, the display 160 can be connected to a further computing device distinct from the device 136. In such embodiments, the device 136 can provide data to be presented on the display 160 to the other computing device, e.g., via a network, peer-to-peer communications link, or the like.

The device 136 can also include other output devices, such as a speaker, or the like. The device 136 can further include one or more input devices, such as a keyboard 164. The device 136 can include a wide variety of other input devices in addition to, or instead of, the keyboard 164. For example, the device 136 can include any suitable combination of a mouse, a touch screen, a microphone, or the like.

In some examples, the scanner 112 can implement the functionality described herein in connection with the computing device 136. For example, the scanner and the device 136 can be integrated into a single device, including computational hardware elements configurable to execute the application 152, as well as the image sensor 120.

As noted above, the device 136 is configured, e.g., via execution of the application 152 by the processor 144, to determine performance metrics based on decode results obtained from the scanner 112. The performance metrics can be presented in conjunction with a representation of the FOV 116, for example, to provide an objective correlation between portions of the FOV 116 and performance of the scanner 112 over time.

Figure 2:
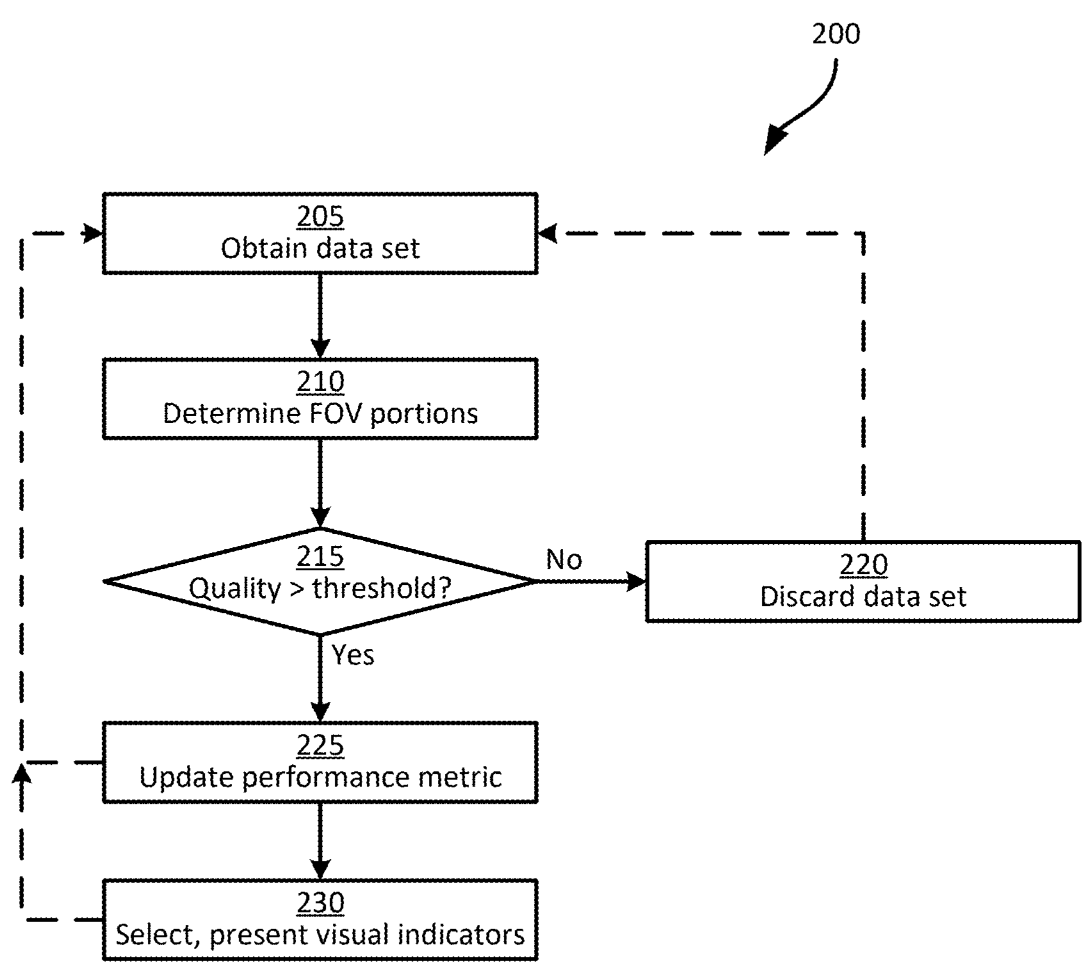
FIG. 2 is a flowchart of a method of monitoring barcode scanner performance.

Turning to FIG. 2, a method 200 of monitoring barcode scanner performance is illustrated. The method 200 is described below in conjunction with its performance by the computing device 136, e.g., via execution of the application 152 by the processor 144, and/or by equivalent dedicated hardware elements as noted earlier.

At block 205, the device 136 is configured to obtain at least one set of data associated with an attempt to decode a barcode by the scanner 112. The scanner 112, as noted earlier, is configured to capture a sequence of images, at least some of which contain barcodes. The scanner 112 is configured to detect the barcodes, and to initiate attempts to decode each detected barcode. For each decode attempt, the scanner 112 can generate a set of data associated with the attempt. The set of data defining a given decode attempt can include various values, described in greater detail below. Each data set can be transmitted by the scanner 112 to the device 136, e.g., via the interface 132. The device 136 can process the data set(s) substantially in real time, e.g., as each data set is received. In other examples, the device 136 can process the data sets in a batchwise manner, e.g., accumulating a given number of data sets or a accumulating data sets for a given period of time before processing the accumulated data sets.

Figure 3:
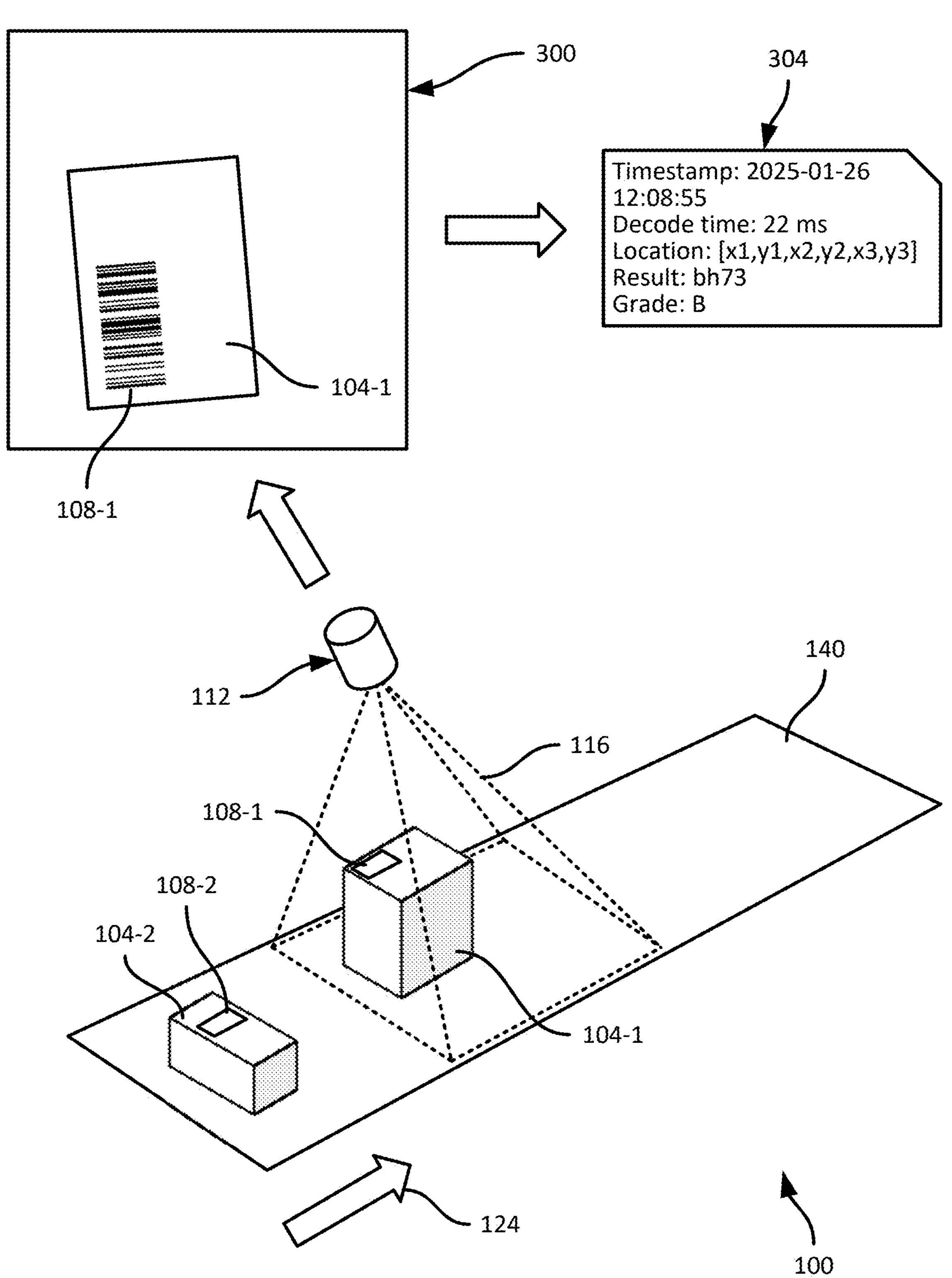
FIG. 3 is a diagram illustrating an example generation of a data set obtained at block 205 of the method of FIG. 2.

Turning to FIG. 3, an example generation of a data set is illustrated. For example, the scanner 112 can capture an image 300 of the FOV 116. As shown in FIGS. 1 and 3, at the time the image 300 is captured, the item 104-1 is within the FOV 116. The image 300 depicts at least a portion of the item 104-1 (e.g., a surface of the item 104-1 facing the scanner 112) and the barcode 108-1. The scanner 112 can be configured to detect the barcode 108-1 within the image 300, and to initiate an attempt to decode the barcode 108-1. The decode attempt can include processing the barcode 108-1 according to one or more symbologies, applying a classification algorithm to select a symbology before such processing, or the like.

Via the decode attempt (as well as the detection of the barcode 108-1 prior to the decode attempt), the scanner 112 can generate various attributes indicative of the position of the barcode 108-1 within the image 300, and of the outcome of the decode attempt. FIG. 3 illustrates a data set 304. The scanner 112 can generate a data set 304 for each decode attempt. Thus, some images may yield multiple data sets (e.g., if the images contain more than one barcode). It will be apparent in the discussion below that in other implementations, the data set 304 In this example, the data set 304 includes a timestamp, e.g., indicating a date and time when the decode attempt was performed. The data set 304 also includes a decode time, indicating a length of time consumed by the decode operation (shown in milliseconds in this example). The data set also includes a location, defining the position of the barcode 108-1 in the image 300. The position can be defined, for example, by pixel coordinates of two or more corners of a bounding box encompassing the barcode 108-1 (coordinates for three corners are shown in the example of FIG. 3). The position can also be defined by coordinates defining one or more corners, as well as one or more vectors defining respective edges of the bounding box.

The data set can further include a result, e.g., in the form of a string ("bh73" in the illustrated example) decoded from the barcode 108-1. If the decode attempt is unsuccessful, the result can be blank, or can include an indication that the decode failed. As also shown in FIG. 3, the data set can include a grade assigned to the barcode 108-1 as shown in the image 300. The grade can be determined, for example, based on barcode quality metrics (BQM) such as those defined in the International Organization for Standardization (ISO) standards 15415 and 15416.

Figure 4:
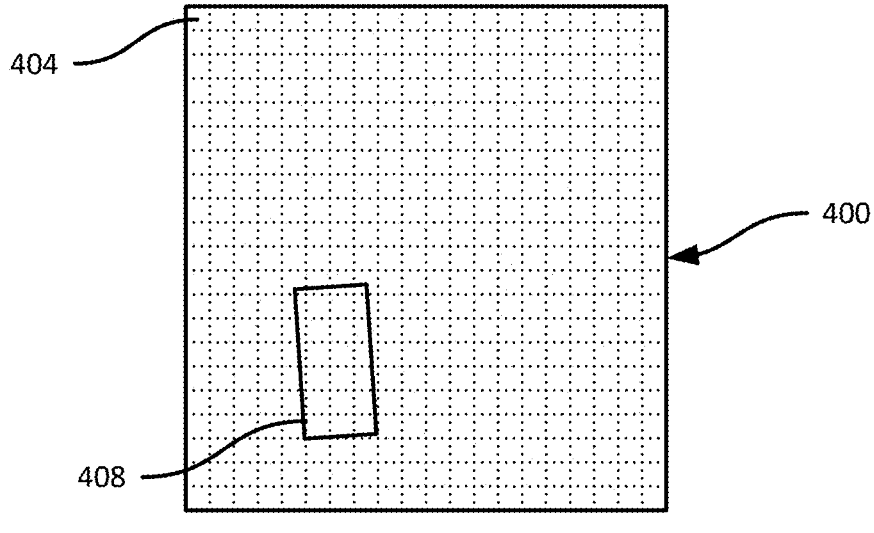
FIG. 4 is a diagram illustrating an example performance of blocks 210 and 225 of the method of FIG. 2.
Figure 4:
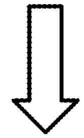
Figure 4:
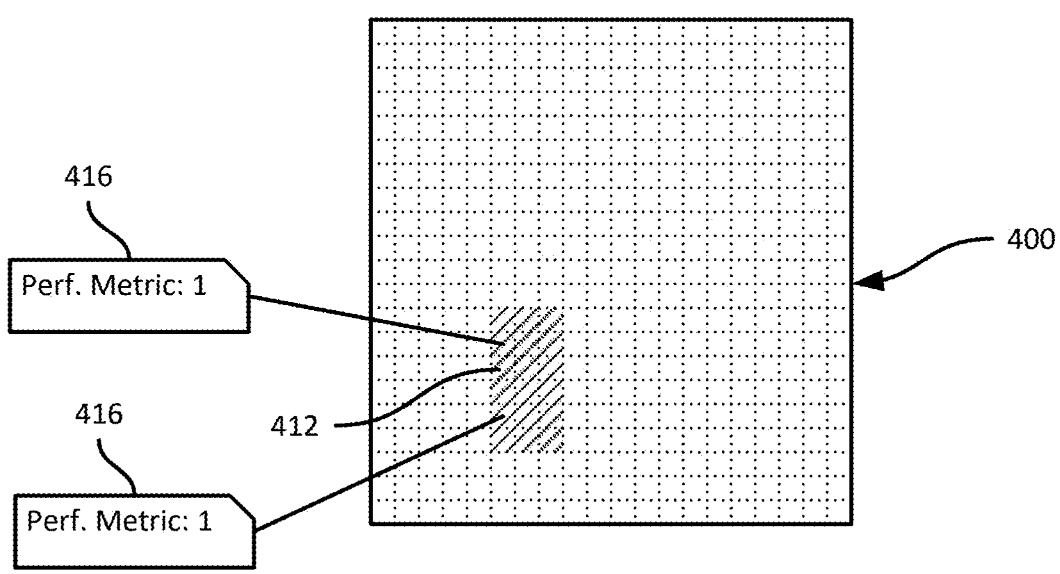

Returning to FIG. 2, at block 210 the device 136 is configured to determine at least one portion of the FOV 116 that corresponds to the location of the barcode 108-1 (or more generally, to the barcode associated with the data set from block 205). The portions can correspond to individual pixels of the sensor 120, such that the portions determined at block 210 include each pixel within the bounding box defined by the location in the data set 304. The portions can be larger than single pixels in other examples. For example, FIG. 4 illustrates an example division of an image plane 400 of the sensor 120 (which corresponds to the FOV 116) into regions 404. In this example, the image plane 400 is divided into four hundred and twenty square regions, each encompassing multiple pixels. A wide variety of divisions, into regions 404 of varying sizes, can be implemented. The more numerous the regions 404, the greater the storage and computation demands may be imposed on the device 136 to generate and present performance metrics, and the number and size of the regions 404 may therefore be selected based in part on the computational resources of the device 136.

The determination at block 210 can include, as shown in FIG. 4, determining which portions 404 are within a bounding box 408 defined in the data set 304, and/or which regions 404 overlap with the bounding box 408 by at least a threshold amount (e.g., 75%, although a wide variety of other thresholds may also be used). As shown in the lower portion of FIG. 4, a set 412 of the portions 404 is determined to correspond to the barcode 108-1 from the image 300.

Following the completion of block 210, the device 136 is configured to perform blocks 215 to 225 (or block 225, if blocks 215 and 220 are omitted as discussed below) for each portion identified at block 210.

Referring again to FIG. 2, at block 215, the device 136 can be configured to determine whether a quality metric from the data set at block 205 exceeds a threshold. When the determination at block 215 is negative, the device 136 can be configured to discard the data set at block 220. Discarding a data set at block 220 can, for example, involve bypassing any updates to performance metrics for the portions 404. The quality metric evaluated at block 215 can include the grade in the data set 304, as shown in FIG. 3. As will be apparent, some failed decode attempts may be correlated with scanner performance, e.g., in that scanner configuration may be optimized to successfully decode the same barcode in the same location. Other failed decode attempts may not be correlated, or may be less correlated, with scanner performance. For example, defects in the barcode 108 or obstructions of the barcode 108, poor contrast between dark and light symbols in the barcode 108, and the like, may increase the likelihood of a failed scan independently of scanner configuration. The performance of blocks 215 and 220 seeks to mitigate the effect of such configuration-independent failed scans on the performance metrics generated for the scanner 112.

For example, the threshold at block 215 can be based on an average grade for barcodes 108 encompassing a given portion 404. If a given data set indicates a grade that is below such an average, the corresponding barcode 108 may have had quality issues independent of scanner configuration. For example, the barcode 108 may have been physically damaged, occluded, or the like. For example, if the average grade for a given portion 404 is "B", any decode attempts yielding a grade of "C" or worse may result in a negative determination at block 215.

In some examples, the performance of block 215, and therefore also the performance of block 220, can be omitted. In some examples, blocks 215 and 220 can be performed only for failed decode attempts. That is, a successful decode attempt may be processed via blocks 225 and 230 regardless of the quality metric for the corresponding barcode 108.

At block 225, following an affirmative determination at block 215, or following block 210 if block 215 is omitted, the device 136 is configured to update a performance metric associated with the portion 404 being processed. Updating the performance metric can include, for example, incrementing the performance metric when the attempt to decode the barcode 108 succeeded, or decrementing the performance metric when the attempt to decode the barcode 108 failed. The performance metric can be, in other words, a count of successful or failed decode attempts for barcodes 108 that encompassed the relevant portion 404. Referring briefly to FIG. 4, the portions 404 in the set 412 may each have a performance metric 416, which in this example has a value of one, indicating that the data set 304 was the first decode attempt coinciding with those portions 404, and that the decode attempt was successful. A failed decode attempt may result in a performance metric of negative one, for example. A wide variety of other scoring mechanisms can also be employed. The performance metric for a given portion 404 indicates a direction (e.g., whether more successful or failed decode attempts have bene registered for the portion 404), and a magnitude (e.g., how many successful or failed decode attempts have bene registered for the portion 404). In other examples, performance metrics can also include, instead of or in addition to the counts mentioned above, one or more time-based metrics, such as any combination of a minimum, average, and maximum decode time for the relevant portion 404.

The performance metric for each portion 404 can be stored in the memory 148, e.g., in association with an identifier of the corresponding portion 404 (e.g., coordinates of the portion 404, or the like). Following block 225, the device 136 can be configured to repeat blocks 215-225 for any other portions 404 affected by the data set obtained at block 205. The device 136 can then, as illustrated by the dashed line in FIG. 2, return to block 205 to obtain the next data set for processing. The device 136 can also, in some examples, select visual indicators corresponding to the portions 404, and present the visual indicators, e.g., on the display 160. Visual indicators can also, in some examples, be selected at block 225 and be stored in association with each portion 404, e.g., along with the performance metrics.

Selecting a visual indicator for a portion 404 can include selecting between a first set of colors and a second set of colors based on the direction of the performance metric for that portion 404. For example, a positive performance metric can be associated with greens, while a negative performance metric can be associated with reds. A wide variety of other color sets, and/or patterns or the like, can also be used as visual indicators.

In addition to selecting between sets of colors as mentioned above, the device 136 can also be configured to select a particular color within the relevant set, based on the magnitude of the performance metric. When visual indicators of performance other than color are employed, such as patterns, the device 136 can be configured to select a visual indicator such as a particular pattern, based on the magnitude of the performance metric, from a set of patterns selected based on the direction of the performance metric.

For example, when the visual indicators are colors, the selection of a set based on direction and a specific color based on magnitude can vary depending on the color space used by the device 136 for such selection. For example, if the device 136 uses a cylindrical color model such as a hue, saturation, value (HSV) model, the device 136 can select a hue based on whether the performance metric for the portion 404 indicates a preponderance of successful decodes or a preponderance of unsuccessful decodes. The device 136 can further select either or both of a saturation and a value for a given hue, based on the magnitude of the performance metric. A greater accumulated number of successful decodes encompassing a given portion 404, for example, may lead to a more saturated green being used as a performance indicator, while a small number of successful decodes encompassing the given portion 404 may result in a paler, less saturated green being used as a performance indicator.

As mentioned above, the visual indicators (e.g., pattern identifiers, color codes, or the like) can be stored in association with the portions 404, e.g., in data records also containing the performance metrics. In other examples, the visual indicators can be determined substantially in real time at the time the device 136 performs block 230. In other words, the device 136 can store rules defining which sets of visual indicators correspond to performance metric directions, and which specific visual indicators correspond to performance metric magnitudes. Such rules may, for example, indicate a specific hue corresponding to positive performance metrics and a specific hue corresponding to negative performance metrics, as well as a function proportionally correlating performance metric magnitude with either or both of saturation and value.

The performance indicators updated at block 225 and presented at block 230 can be maintained persistently at the device 136, such that an update applied to the performance metric for a given portion 404 at block 225 is cumulative with a previously stored performance metric for that portion 404. In other words, over time the performance metrics for the portions 404 are accumulated representations of the successful and failed decode operations encompassing those portions 404.

Figure 5:
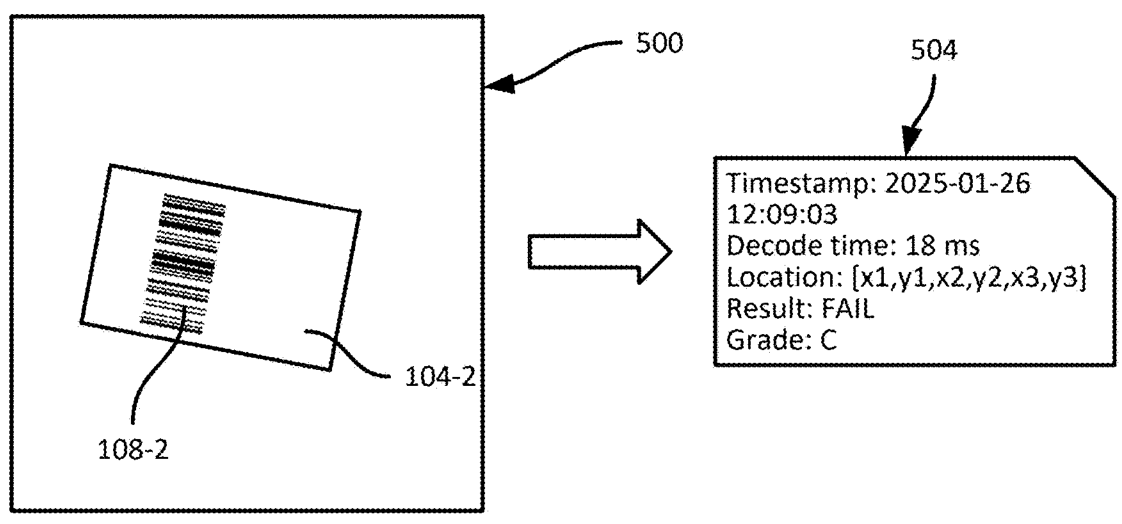
FIG. 5 is a diagram illustrating another example performance of blocks 205, 210, and 225 of the method of FIG. 2.
Figure 5:
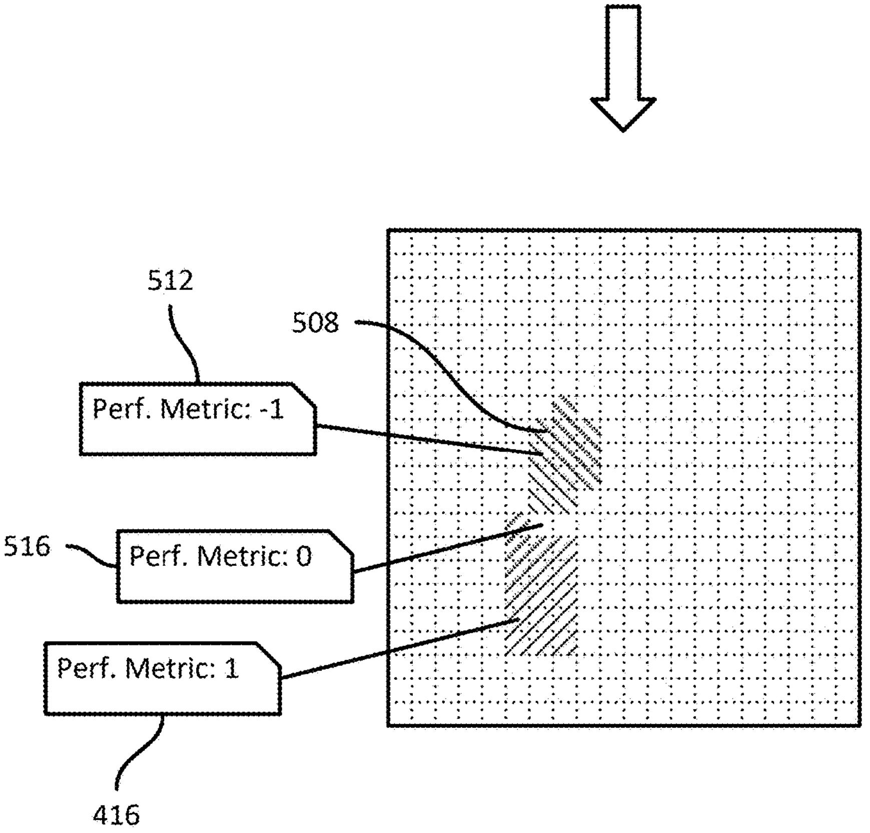

Turning to FIG. 5, a further example performance of the method 200 is illustrated, e.g., initiated in response to capture of an image 500 containing the item 104-2 and the barcode 108-2. The scanner 112 may, for example, generate a data set 504 associated with an attempt to decode the barcode 108-2. As shown in FIG. 5, the data set 504 indicates that decoding failed for the barcode 108-2. The device 136 is configured to determine that the location of the barcode 108-2 in the image 500 encompasses a set 508 of the portions 404 of the FOV 116, and to decrement the performance metrics associated with the portions 404 in the set 508. Decrementing the performance metrics for those portions 404 results in certain portions 404 having a performance metric 512 with a value of negative one. Performance metrics for certain ones of the same portions 404 were previously updated to a value of one in response to decoding of the barcode 108-1, and the adjustment at the current performance of block 225 therefore assigns those portions a performance metric 516 with a value of zero.

Figure 6A:
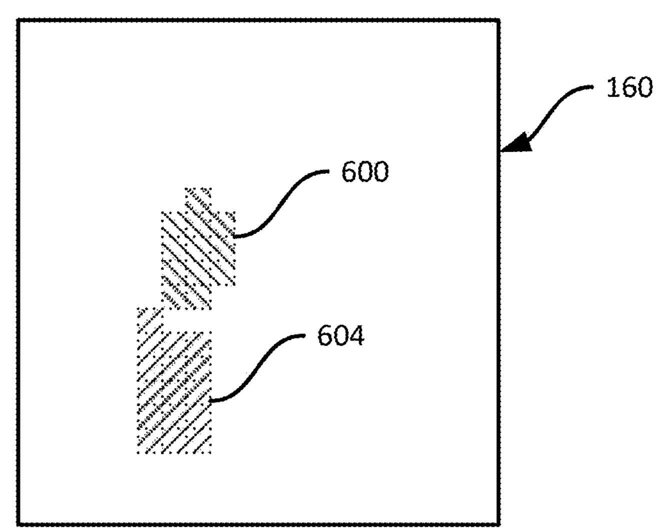
FIG. 6A is an example of visual indicators presented at block 230 of the method of FIG. 2.

Turning to FIG. 6A, an example performance of block 230 is illustrated, based on the performance metrics shown in FIG. 5. The performance of block 230 can include, for example, presenting a heat map on the display 160, with regions 600 and 604 having different colors, intensities, and/or other suitable visual indicators selected according to the underlying performance metrics for the corresponding portions 404. The heat map provides a time-accumulated indication of the historical decoding performance of the scanner 112 for each portion of the FOV 116. In some examples, the heat map may be configured to present a subset of performance data corresponding to, for each portion 404, a single point in time. According to one example, a selectable setting for the heat map may retrieve and present the highest performance metric sample for each portion 404. Moreover, the heat map can be configured to use a "MAX" function, which provides the highest (e.g., historical) performance metric sample for each portion 404, such that the heat map presents the best performance metric sample for each portion 404 at any given point in time. The visual representation of historical decoding performance can be used to determine configuration adjustments to the scanner 112.

In further examples, the portions 404 of the FOV 116 can be defined in three dimensions. The scanner 112 can include, for example, one or more range finding sensors, a stereoscopic image sensor, or the like, configured to generate a depth map along with images of the FOV 116. In other examples, the barcodes 108 can include range finding features, e.g., with predetermined physical dimensions that can be stored at the scanner 112 or otherwise accessible to the scanner 112. Based on the pixel dimensions of such features in captured images and the stored physical dimensions, the scanner 112 can determine a distance from the sensor 120 to a barcode 108. Each data set 304, 504 generated by the scanner 112 can therefore include, e.g., as components of the location data, a bounding box in pixel coordinates, and a depth measurement. The portions 404 can therefore be defined by pixel coordinates or regions encompassing multiple pixels as discussed earlier, along with depth-based boundaries. In other words, each group of adjacent pixel coordinates, such as those representing a given portion 404 illustrated in FIG. 4, can correspond to a plurality of portions 404 at different depths from one another.

Figure 6B:
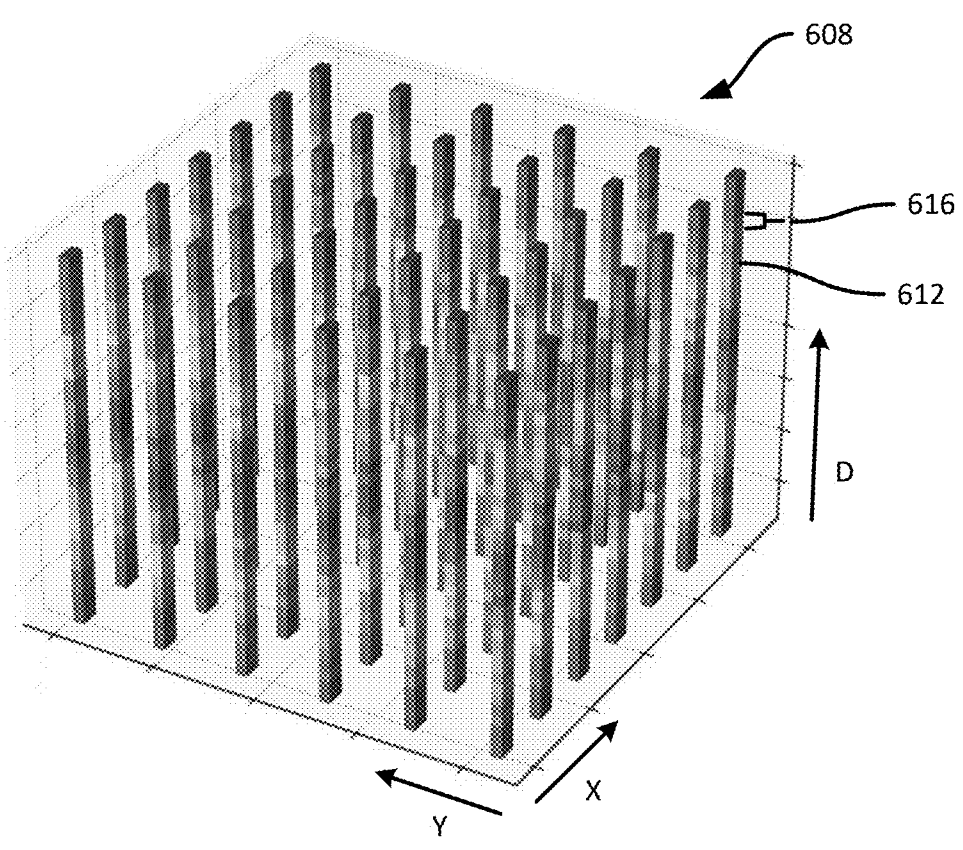
FIG. 6B is another example of visual indicators presented at block 230 of the method of FIG. 2.

The device 136 can, in such embodiments, present visual indicators of the performance metrics in a three-dimensional heat map 608, an example of which is illustrated in FIG. 6B. For example, the heat map 608 can include a plurality of columns 612 of individual visual indicators 616. Each indicator 616 corresponds to a portion 404 defined by X and Y coordinates and a depth ("D") from the sensor 120. The heat map 608 may permit the detection of further configuration optimizations for the scanner 112, such as adjustments to focal depth, or the like.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system, comprising:
- a barcode scanner configured to:
  - capture a plurality of images corresponding to a field of view of the barcode scanner, each image containing a barcode;
  - for each of the captured images, (i) initiate an attempt to decode the barcode, and (ii) generate a set of data associated with the attempt to decode the barcode; and
- a computing device configured to:
  - obtain the sets of data from the barcode scanner;
  - for each of a plurality of portions of the field of view, generate a performance metric based on at least one of the sets of data from the barcode scanner; and
  - control a display to present the portions of the field of view, each presented portion having a visual indicator selected according to the corresponding performance metric.

2. The system of claim 1, wherein each set of data includes a region of the field of view occupied by the barcode; and
- wherein the computing device is configured to determine the plurality of portions of the field of view that are encompassed by the region.

3. The system of claim 1, wherein the computing device is configured to generate the performance metric by:
- incrementing the performance metric when the attempt to decode the barcode succeeded, or
- decrementing the performance metric when the attempt to decode the barcode failed.

4. The system of claim 3, wherein the computing device is further configured to:
- select the visual indicator for each presented portion based on a magnitude and a direction of the performance metric for the presented portion.

5. The system of claim 4, wherein the computing device is further configured to select the visual indicator for each presented portion by:
- selecting between a first set of colors and a second set of colors based on the direction of the performance metric; and
- selecting a color within the selected one of the first set and the second set based on the magnitude of the performance metric.

6. The system of claim 1, wherein each set of data includes a quality metric corresponding to the corresponding barcode; and
- wherein the computing device is further configured, before generating the performance metrics for each of the plurality of portions, to determine that the quality metric exceeds a threshold.

7. The system of claim 6, wherein the computing device is configured to determine the threshold based on historical quality metrics for the portions of the field of view.

8. The system of claim 6, wherein the quality metric includes a barcode grade.

9. A method, comprising:
- obtaining, at a computing device communicatively connected with a barcode scanner, a plurality of sets of data associated with attempts to decode barcodes within a field of view of the barcode scanner;
- for each of a plurality of portions of the field of view, generating a performance metric at the computing device based on at least one of the sets of data from the barcode scanner; and
- controlling a display to present the portions of the field of view, each presented portion having a visual indicator selected according to the corresponding performance metric.

10. The method of claim 9, wherein each set of data includes a region of the field of view occupied by the barcode; and
- wherein the method further comprises determining the plurality of portions of the field of view that are encompassed by the region.

11. The method of claim 9, wherein generating the performance metric comprises:
- incrementing the performance metric when the attempt to decode the barcode succeeded, or
- decrementing the performance metric when the attempt to decode the barcode failed.

12. The method of claim 11, further comprising:
- selecting the visual indicator for each presented portion based on a magnitude and a direction of the performance metric for the presented portion.

13. The method of claim 12, wherein selecting the visual indicator for each presented portion includes:
- selecting between a first set of colors and a second set of colors based on the direction of the performance metric; and
- selecting a color within the selected one of the first set and the second set based on the magnitude of the performance metric.

14. The method of claim 9, wherein each set of data includes a quality metric corresponding to the corresponding barcode; and
- wherein the method further comprises, before generating the performance metrics for each of the plurality of portions, determining that the quality metric exceeds a threshold.

15. The method of claim 14, further comprising determining the threshold based on historical quality metrics for the portions of the field of view.

16. The method of claim 14, wherein the quality metric includes a barcode grade.

17. A computing device, comprising:
- a communications interface;
- a display; and a processor configured to:

obtain, via the communications interface from a barcode scanner, a plurality of sets of data associated with attempts to decode barcodes within a field of view of the barcode scanner;

for each of a plurality of portions of the field of view, generate a performance metric at the computing device based on at least one of the sets of data from the barcode scanner; and control the display to present the portions of the field of view, each presented portion having a visual indicator selected according to the corresponding performance metric.

18. The computing device of claim 17, wherein each set of data includes a region of the field of view occupied by the barcode; and wherein the processor is configured to determine the plurality of portions of the field of view that are encompassed by the region.

19. The computing device of claim 17, wherein the processor is configured to generate the performance metric by:

incrementing the performance metric when the attempt to decode the barcode succeeded, or decrementing the performance metric when the attempt to decode the barcode failed.

20. The computing device of claim 17, wherein the computing device is further configured to:

select the visual indicator for each presented portion based on a magnitude and a direction of the performance metric for the presented portion.

* * * * *